(12) United States Patent
Dively

(10) Patent No.: US 10,244,742 B1
(45) Date of Patent: Apr. 2, 2019

(54) FISHING HOOK AND COVER

(71) Applicant: Jack Dively, Littleton, CO (US)

(72) Inventor: Jack Dively, Littleton, CO (US)

( * ) Notice: Subject to any disclaimer, the term of this patent is extended or adjusted under 35 U.S.C. 154(b) by 0 days.

(21) Appl. No.: 14/854,130

(22) Filed: Sep. 15, 2015

(51) Int. Cl.
*A01K 85/02* (2006.01)
*A01K 83/02* (2006.01)
*A01K 97/06* (2006.01)

(52) U.S. Cl.
CPC .............. *A01K 85/02* (2013.01); *A01K 83/02* (2013.01); *A01K 97/06* (2013.01)

(58) Field of Classification Search
CPC ........ A01K 83/02; A01K 85/00; A01K 85/02; A01K 97/06
USPC ....... 43/25.2, 34–37, 41, 41.2, 42.08, 42.36, 43/42.4, 42.41, 43.16, 43.2, 43.4, 54.1, 43/57.1
See application file for complete search history.

(56) References Cited

U.S. PATENT DOCUMENTS

| 2,590,752 | A | * | 3/1952 | Chaffee | A01K 85/02 43/35 |
| 2,733,533 | A | | 2/1956 | Standard | |
| 3,117,389 | A | * | 1/1964 | King | A01K 85/02 43/35 |
| 3,802,114 | A | * | 4/1974 | Diebold | A01K 85/02 43/37 |
| 4,081,923 | A | | 4/1978 | Pruncutz | |
| D324,768 | S | | 3/1992 | Johnson | |
| 5,195,268 | A | | 3/1993 | Ellis | |
| 5,335,441 | A | | 8/1994 | Blackwell | |
| 6,023,876 | A | * | 2/2000 | Haddad | A01K 97/06 43/25.2 |
| 6,105,303 | A | * | 8/2000 | Hall, Sr. | A01K 85/02 43/37 |
| 6,711,848 | B1 | * | 3/2004 | Gammieri | A01K 85/02 43/35 |
| 6,772,552 | B2 | * | 8/2004 | Parrish | A01K 85/02 43/35 |
| 7,069,687 | B2 | | 7/2006 | Jang | |
| 7,152,364 | B1 | | 12/2006 | Repine | |
| 7,698,852 | B1 | * | 4/2010 | Cox | A01K 85/02 43/35 |
| 8,689,479 | B1 | * | 4/2014 | Smith | A01K 85/02 43/37 |
| 2005/0178042 | A1 | * | 8/2005 | Dodge | A01K 97/06 43/25.2 |

(Continued)

FOREIGN PATENT DOCUMENTS

WO    WO8911791 A1 * 12/1989 .............. A01K 97/06

*Primary Examiner* — Darren W Ark
*Assistant Examiner* — Brady W Frazier

(57) ABSTRACT

The fishing hook and cover includes a fishing hook that is attached to an interior surface of the cover such that the fishing hook may be rotated inside of the cover when not in use, and conversely rotated outside of the cover when the fishing hook is in use. The cover features a first opening on a first distal end and a second opening on a second distal end. The first opening enables a fishing line to extend into the cover. The second opening enables the fishing hook to rotate inside of the cover or outside of the cover. The cover includes a hook hinge that is positioned on an interior surface of the cover. Moreover, the hook hinge is adjacent to the second opening, which enables the fishing hook to rotate from inside of the cover to outside of the cover.

7 Claims, 4 Drawing Sheets

(56) References Cited

U.S. PATENT DOCUMENTS

2009/0094881 A1\* 4/2009 Konopa ................ A01K 97/06
                                                    43/57.1

\* cited by examiner

FISHING HOOK AND COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of fishing hooks, more specifically, a cover that is hingedly connected to a fishing hook such that the fishing hook is able to rotate into an interior of the cover when not in use.

SUMMARY OF INVENTION

The fishing hook and cover includes a fishing hook that is attached to an interior surface of the cover such that the fishing hook may be rotated inside of the cover when not in use, and conversely rotated outside of the cover when the fishing hook is in use. The cover is a hollowed cylinder that is constructed of two parts that pivot via a cylinder hinge to enable the cover to be opened and conversely closed. The cover features a first opening on a first distal end and a second opening on a second distal end. The first opening enables a fishing line to extend into the cover. The second opening enables the fishing hook to rotate inside of the cover or outside of the cover. The cover includes a hook hinge that is positioned on an interior surface of the cover. Moreover, the hook hinge is adjacent to the second opening, which enables the fishing hook to rotate from inside of the cover to outside of the cover.

These together with additional objects, features and advantages of the fishing hook and cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing hook and cover in detail, it is to be understood that the Fishing hook and cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing hook and cover.

It is therefore important that the claims be regarded as including such equivalent construction insofar as they do not depart from the spirit and scope of the fishing hook and cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
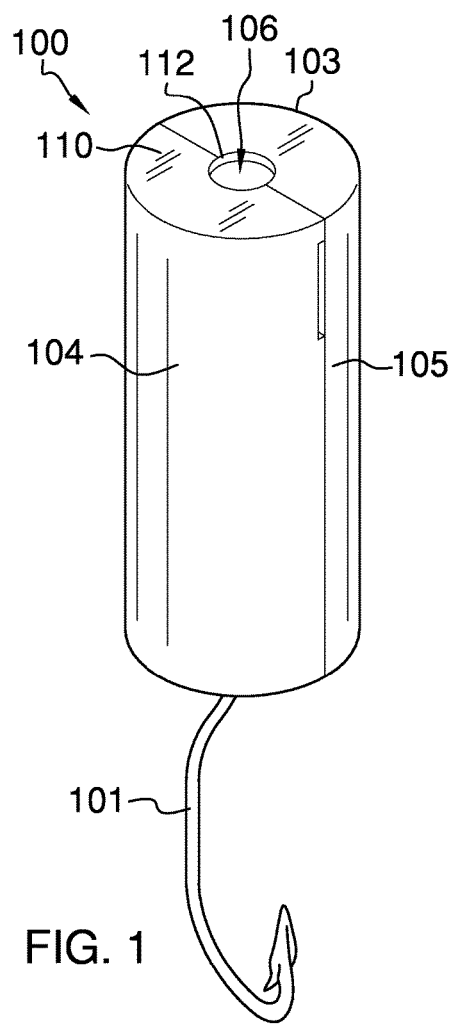
FIG. 1 is a perspective view of an embodiment of the disclosure.
Figure 2:
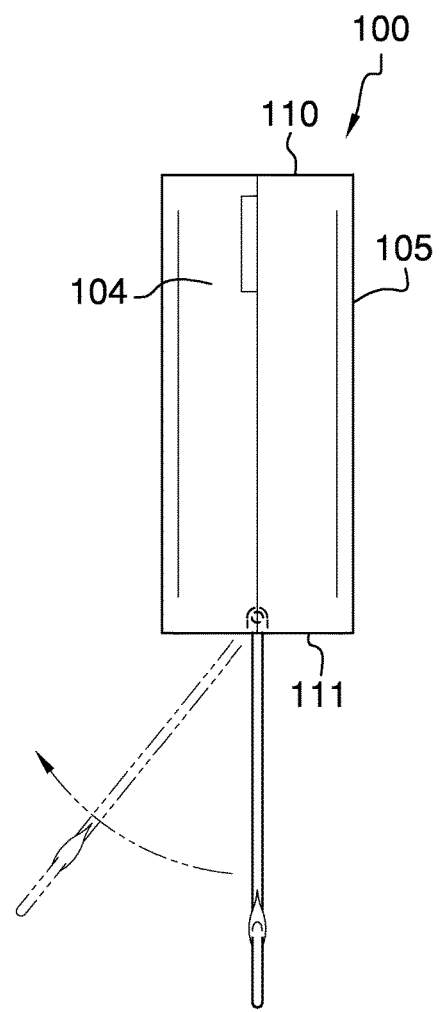
FIG. 2 is a front view of an embodiment of the disclosure.
Figure 3:
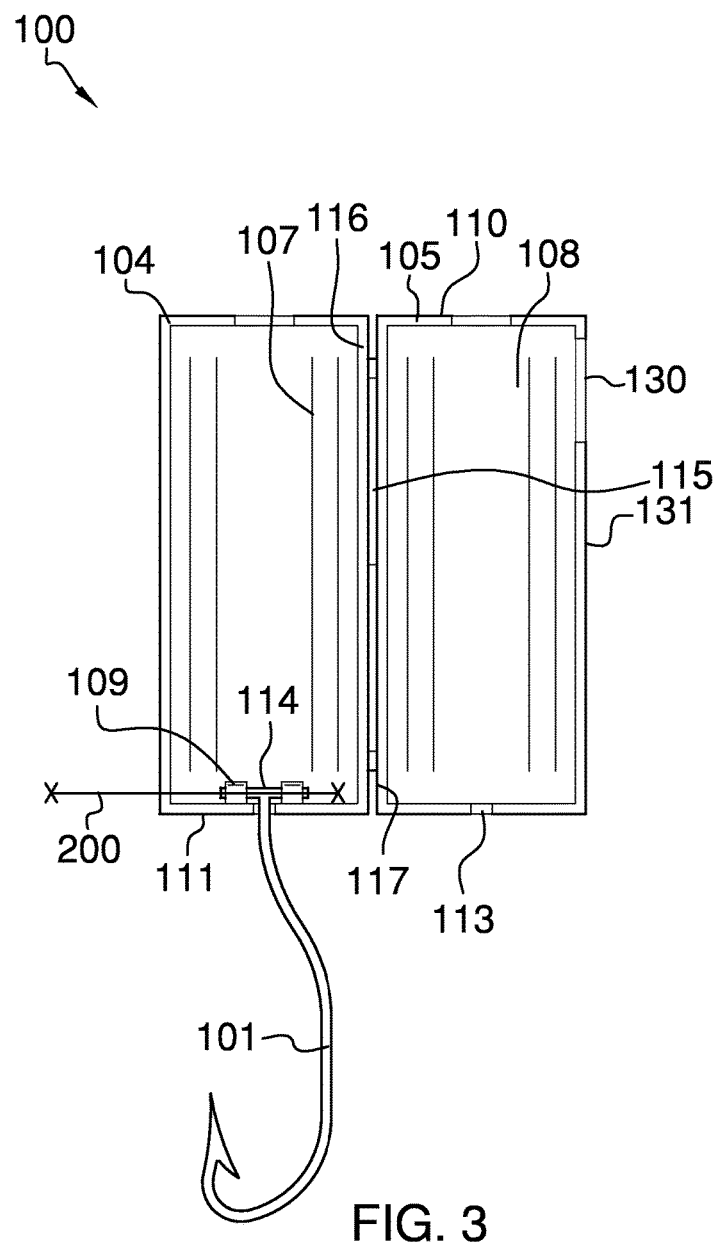
FIG. 3 is a side view of an embodiment of the disclosure.
Figure 4:
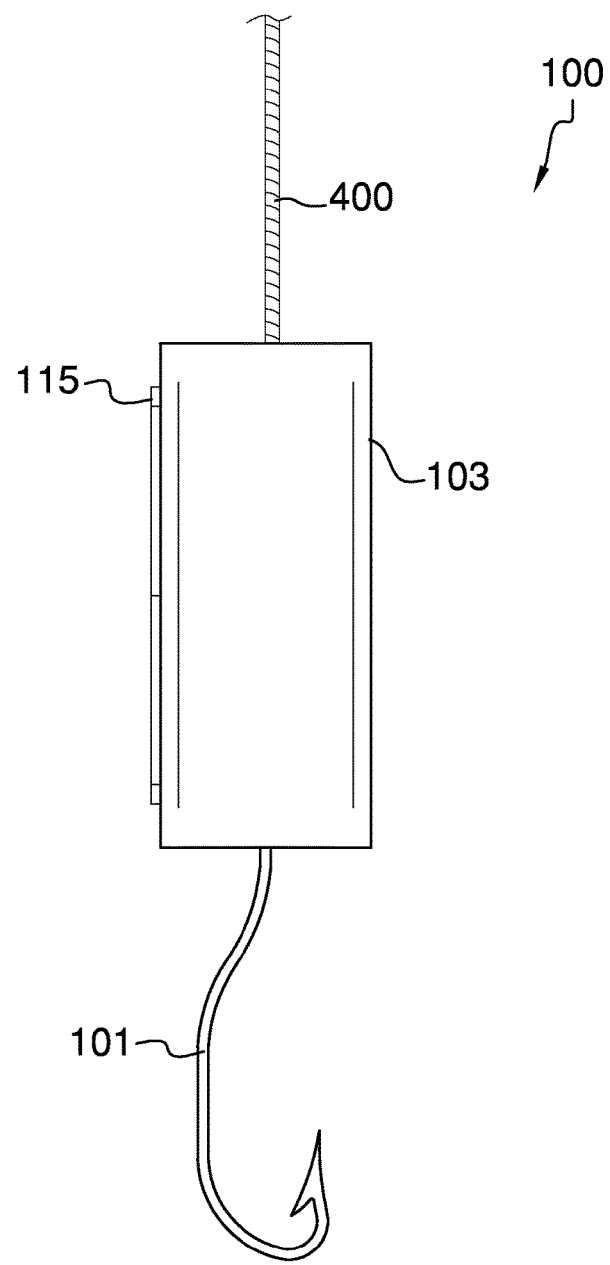
FIG. 4 is another side view of an embodiment of the disclosure.
Figure 5:
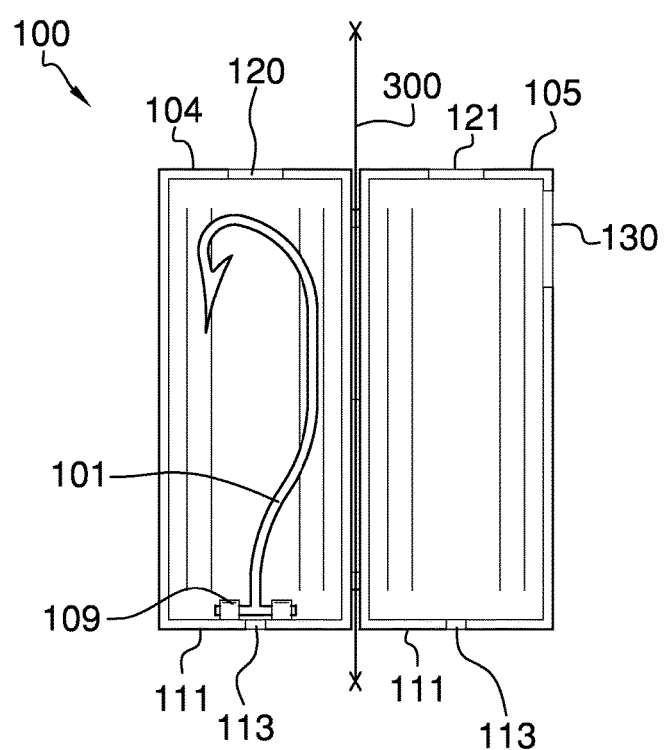
FIG. 5 is a third side view of an embodiment of the disclosure.

Detailed reference will now be made to several potential embodiment of the disclosure, which are illustrated in FIGS. 1 through 5. The Fishing hook and cover 100 (hereinafter invention) comprises a fishing hook 101 that is attached via a hook hinge 109 to a cover 103. The cover 103 is further defined with a first cover member 104 and a second cover member 105. The first cover member 104 and the second cover member 105 collectively form a cylindrically-shaped object.

The cover 103 is further defined with an interior 106. The first cover member 104 is further defined with a first interior surface 107; whereas the second cover member 105 is further defined with a second interior surface 108. The first interior surface 107 includes a hook hinge 109 thereon. Moreover, the hook hinge 109 attaches to the fishing hook 101.

The cover 103 is further defined with a first distal end 110 and a second distal end 111. The first distal end 110 includes a first opening 112; whereas the second distal end 111 includes a second opening 113. The first opening 112 is formed from both the first cover member 104 as well as the second cover member 105. The second opening 113 is formed from both the first cover member 104 as well as the second cover member 105.

The hook hinge 109 is located adjacent to the second distal end 111, and more importantly, the second opening 113. The hook hinge 109 attaches to a lateral hook member 114 of the fishing hook 101. The fishing hook 101 includes the lateral hook member 114 in order to enable the fishing hook 101 to rotate about a horizontal axis 200. The rotation of the fishing hook 101 about the horizontal axis 200, and with respect to the hook hinge 109 enables the fishing hook 101 to rotate out of the cover 103 as well as into the interior 106 of the cover 103. The hook hinge 109 enables the fishing hook 101 to be concealed within the cover 103 when the fishing hook 101 is not in use.

The first cover member 104 and the second cover member 105 are attached to one another via a cylinder hinge 115. The cylinder hinge 115 is attached to a third edge 116 of the first cover member 104 as well as a fourth edge 117 of the second cover member 105. The cylinder hinge 115 enables the first cover member 104 to rotate relative the second cover member 105. Moreover, the cylinder hinge 115 rotates relative to a vertical axis 300.

The first opening 112 of the cover 103 is adapted to enable a fishing line 400 to extend from the invention 100. As previously mentioned, the first opening 112 is formed from the first cover member 104 and the second cover member 105. The first opening 112 is derived from a fifth recess 120 and a sixth recess 121. The fifth recess 120 is provided on the first cover member 104; whereas the sixth recess 121 is provided on the second cover member 105. The second cover member 105 may include an open tap 130 that aids in opening the cover 103 from a closed orientation. The open tap 130 is opposite the fourth edge 117 of the second cover member 105. The open tap 130 is provided on a sixth edge 131 of the second cover member 105. Therefore, the sixth edge 131 is opposite of the fourth edge 117.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fishing hook and cover comprising:
a fishing hook rotatably engaged with respect to the cover in order to hide the fishing hook inside of the cover when not in use, and conversely extend from said cover when the fishing hook is in use;
wherein the fishing hook is attached via a hook hinge to the cover;
wherein the cover is further defined with a first cover member and a second cover member;
wherein the first cover member and the second cover member collectively form a cylindrically-shaped object;
wherein the cover is further defined with an interior;
wherein the first cover member is further defined with a first interior surface;
wherein the second cover member is further defined with a second interior surface;
wherein the first interior surface includes a hook hinge thereon;
wherein the hook hinge attaches to the fishing hook;
wherein the cover is further defined with a first proximal end and a second distal end; wherein the first proximal end includes a first opening
wherein the second distal end includes a second opening;
wherein the first opening is formed from both the first cover member as well as the second cover member;
wherein the second opening is formed from both the first cover member as well as the second cover member;
wherein the hook hinge is located adjacent to the second distal end;
wherein the hook hinge attaches to a lateral hook member of the fishing hook;
wherein the fishing hook includes the lateral hook member in order to enable the fishing hook to rotate about a horizontal axis;
wherein the rotation of the fishing hook about the horizontal axis, and with respect to the hook hinge enables the fishing hook to rotate out of the cover as well as into the interior of the cover;
wherein the hook hinge enables the fishing hook to be concealed within the cover when the fishing hook is not in use;
wherein the first cover member and the second cover member are attached to one another via a cylinder hinge;
wherein the cylinder hinge is attached to a third edge of the first cover member as well as a fourth edge of the second cover member.

2. The fishing hook and cover according to claim 1 wherein the cylinder hinge enables the first cover member to rotate relative the second cover member; wherein the cylinder hinge rotates relative to a vertical axis.

3. The fishing hook and cover according to claim 2 wherein the first opening of the cover is adapted to enable a fishing line to extend through the cover.

4. The fishing hook and cover according to claim 3 wherein the first opening is formed from the first cover member and the second cover member; wherein the first opening is derived from a fifth recess and a sixth recess.

5. The fishing hook and cover according to claim 4 wherein the fifth recess is provided on the first cover member; wherein the sixth recess is provided on the second cover member.

6. The fishing hook and cover according to claim 5 wherein the second cover member may include an open tap that aids in opening the cover from a closed orientation.

7. The fishing hook and cover according to claim 6 wherein the open tap is opposite the fourth edge of the second cover member; wherein the open tap is provided on a sixth edge of the second cover member.

* * * * *